United States Patent [19]

Cosar et al.

[11] Patent Number: 4,477,251
[45] Date of Patent: Oct. 16, 1984

[54] PROCESS AND APPARATUS FOR CALCINING PULVERULENT MATERIAL

[75] Inventors: Paul Cosar, Paris; Jean-Pierre Henin, La Madeleine, both of France

[73] Assignee: Fives-Cail Babcock, Paris, France

[21] Appl. No.: 425,294

[22] Filed: Sep. 28, 1982

[30] Foreign Application Priority Data

Sep. 28, 1981 [FR] France .............................. 81 18195

[51] Int. Cl.³ .............................................. F27B 7/02
[52] U.S. Cl. ...................................... 432/106; 432/58; 110/245
[58] Field of Search ....................... 110/245, 255, 248; 432/58, 106

[56] References Cited

U.S. PATENT DOCUMENTS

| | | | |
|---|---|---|---|
| 4,240,364 | 12/1980 | Byers et al. | 110/245 |
| 4,314,967 | 2/1982 | Kwon et al. | 110/245 |
| 4,377,119 | 3/1983 | Noack | 110/245 |
| 4,419,940 | 12/1983 | Cosar et al. | 110/245 |

FOREIGN PATENT DOCUMENTS

| | | | |
|---|---|---|---|
| 56-23623 | 3/1981 | Japan | 110/245 |
| 56-91113 | 7/1981 | Japan | 110/245 |
| 2040420 | 8/1980 | United Kingdom | 110/245 |

*Primary Examiner*—Henry C. Yuen
*Attorney, Agent, or Firm*—Kurt Kelman

[57] ABSTRACT

A process for the calcination of a solid pulverulent material comprises the steps of gasifying a solid fuel in a fluidized bed to produce an ascending current of gaseous fuel, and injecting the material in an oxidizing carrier gas into the ascending gaseous fuel current above the fluidized bed of solid fuel to disperse the pulverulent material in the gaseous fuel current, the flow velocity of the gases in the zone of injection of the material into the current being sufficient to entrain the material in the gases and to prevent them from falling into the fluidized bed. An apparatus for the calcination comprises a calcination chamber whose bottom is a grid carrying a bed of solid fuel through which air is blown to produce the ascending current of gaseous fuel in the chamber. An array of nozzles in an upper portion of the chamber is used to inject the pulverulent material suspended in the carrier gas into the chamber above the fluidized bed.

3 Claims, 1 Drawing Figure

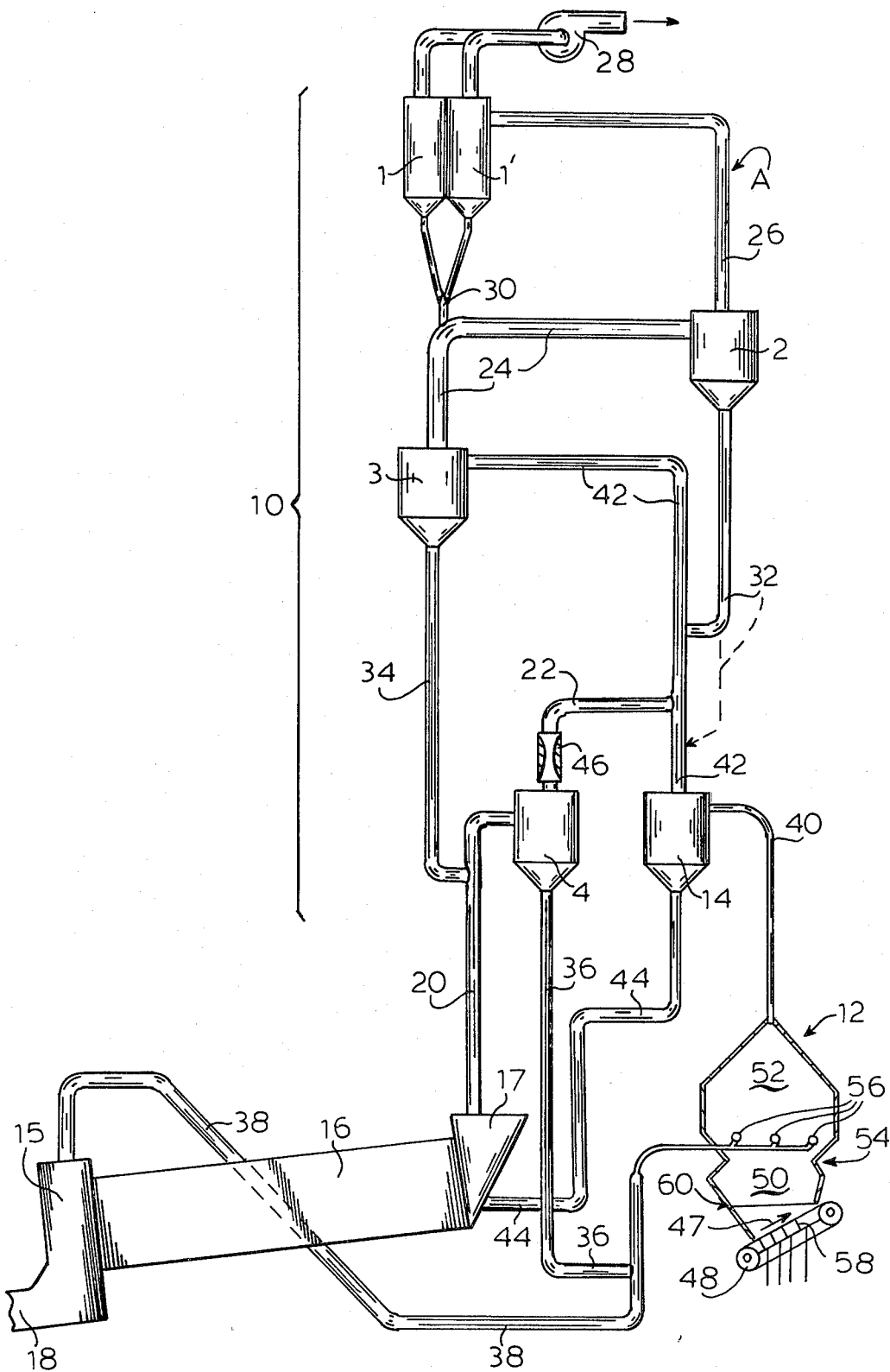

PROCESS AND APPARATUS FOR CALCINING PULVERULENT MATERIAL

The present invention relates to the calcination of solid pulverulent material, such as mineral raw material for the preparation of cement clinker, with the use of a solid fuel.

In known processes of this type, the solid fuel is usually burned in a separate chamber to produce hot gases wherein the solid pulverulent material to be calcined is suspended. If the temperature of the gases is too high, the material particles may begin to fuse, forming scales on the walls of the chamber and at the discharge gates. To avoid this, the gases may be diluted, for example by recycling them, but this increases the gas flow circuit and, accordingly, the cost of the installation. It has also been proposed to use a gasifier producing combustible gases which are burned in a calcination kiln. The resultant combustion generally produces gases of high temperatures, thus risking fusion of the material particles, as in the first-named procedure. Furthermore, either process requires two pieces of apparatus, i.e. a combustion chamber or a gasifier and a calcination kiln.

In another process, the solid fuel is pulverized and mixed with the solid pulverulent material in a fluidized bed. The calcined material and the fuel ashes are removed either by overflow from the bed or pneumatically if the fluidized bed is diluted. This process has two disadvantages. It necessitates the comminution of the fuel, which is expensive in the case of many otherwise very useful fuels, and it does not permit the ashes to be separated from the calcined material, which may damage the quality of the product, particularly if it is cement clinker.

It is the primary object of this invention to overcome the indicated disadvantages of prior calcination processes and to permit the use of a number of solid fuels for the calcination of solid pulverulent mineral materials, including fuels very poor in ashes, with a relatively large grain size (up to about 10 mm) and, therefore, not requiring costly preparations.

The above and other objects are accomplished according to one aspect of the invention with a process for the calcination of a solid pulverulent material, which comprises the steps of gasifying a solid fuel in a fluidized bed to produce an ascending current of gaseous fuel, and injecting the material in a combustible carrier gas into the ascending gaseous fuel current above the fluidized bed of solid fuel to disperse the pulverulent material in the gaseous fuel current, the flow velocity of the gases in the zone of injection of the material into the current being sufficient to entrain the material in the gases and to prevent them from falling into the fluidized bed.

According to another aspect of the present invention, an apparatus is provided for the calcination of a solid pulverulent material, which comprises the combination of a chamber having a bottom, a grid at the bottom of the chamber, means for delivering a solid fuel to the grid, means for blowing air into the chamber across the grid to form a fluidized bed of the fuel on the grid and to burn the fuel whereby an ascending current of gasified fuel is produced in the chamber above the fluidized bed of fuel, and means in an upper portion of the chamber for injecting the pulverulent material suspended in a carrier gas into the chamber above the fluidized fuel bed.

The above and other objects, advantages and features of this invention will become more apparent from the following detailed description of a now preferred embodiment thereof, taken in conjunction with the single FIGURE of the accompanying schematic drawing showing an installation for producing cement clinker and incorporating the apparatus of the invention.

In a generally conventional manner, the cement clinker production installation illustrated herein by way of example comprises rotary tubular kiln 16 arranged to rotate about an inclined axis and which has an upstream end 17 and a downstream end 15 with respect to the direction of circulation of the solid pulverulent raw material, the material being converted into cement clinker in the kiln and a cooling chamber being connected to the downstream end to receive the clinker for cooling. The raw material is preheated in multi-stage heat exchanger 10 consisting of four cyclone stages and the installation includes calcination kiln 12 built according to this invention.

Preheating heat exchanger 10 is comprised of a first stage consisting of twin cyclones 1, 1' connected in parallel and second, third and fourth stages 2, 3 and 4 each consisting of a single cyclone. The cyclone of fourth preheater stage 4 is connected by flue 20 to the hood of a smoke chamber arranged at upstream end 17 of rotary kiln 16.

The exhaust fumes from kiln 16 pass through the smoke chamber flue 20 whence they enter the cyclone of stage 4 and are successively exhausted through flue 22 into the cyclone of stage 3, through flue 24 into the cyclone of stage 2 and through flue 26 into the twin cyclones of stage 1, 1', being exhausted into the atmosphere by fan 28 after dust has been removed from the fumes after they leave the first stage. The pulverulent raw material is delivered to the preheater at A, the updraft in flue 26 carrying the cold raw material to the first preheater stage where it is separated from the fumes in the twin cyclones and whence it leaves through conduit 30 leading to flue 24. The updraft in this flue carries the raw material into the cyclone of the second stage which it leaves through conduit 32 leading to flue 22 which carries the material into the cyclone of the third stage. Conduit 34 connects the raw material outlet of the cyclone of the third stage to flue 20 which carries the pulverulent raw material to the cyclone of the fourth stage. In this manner, the pulverulent raw material fed into the system at A is preheated in countercurrent flow through the successive cyclones by the fumes of the kiln. Flue 38 connects hood 15 over clinker cooler 18 to calcination kiln 12 to exhaust hot air from the downstream end of the rotary kiln 16 to the calcination kiln and conduit 36 connects the raw material outlet of the cyclone of the fourth stage to flue 38 so that the preheated raw material is carried by the hot air stream in flue 38 to the calcination kiln.

Calcination kiln 12 defines a chamber whose bottom is constituted by grid 48. In the illustrated embodiment, this grid is constituted by an endless perforated belt moving clockwise in the direction of arrow 47. As shown, the grid is inclined and the forward or leading part of the grid, seen in the direction of movement of the mobile grid, is higher than the rear or trailing part thereof. Upper calcination chamber 52 is separated from lower chamber 50 adjacent the bottom thereof by zone 54 of reduced section. Means is arranged in upper chamber 52 for injecting the preheated pulverulent material suspended in hot carrier air in flue 38 into the chamber, the illustrated injecting means being constituted by an array of nozzles 56 connected to flue 38. In the embodiment shown herein, a row of nozzles 56 is mounted on the kiln wall a short distance above constricted zone 54 and this zone aids in preventing the material from falling into lower chamber 50 while it is being calcined in the chamber. Nozzles 56 may be spaced regularly about the perimeter of the chamber wall or, if the chamber is of rectangular cross section, they may be arranged solely along one longitudinal wall thereof at a predetermined side of the chamber.

The structure of the lower calcination chamber is analogous to that of a fluidized bed arrangement as described and illustrated in French Pat. No. 1,440,039. Means constituted by wind boxes 58 is arranged below the upper run of endless grid belt 48 for blowing air into the chamber across the grid to form a fluidized bed of fuel on the grid and to burn the fuel whereby an ascending current of gaseous fuel is produced in the chamber above the fluidizing bed of fuel. Means 60 for delivering a solid fuel to the grid is mounted in lower chamber portion 50 above the rear part of the grid. Suitable control valves in the solid fuel delivery means and/or the wind boxes control the delivery rate of the fuel and/or the flow of air blown across the grid to maintain the surface of the fluidized bed below the level of the higher forward end of the mobile grid. This disposition enables the ashes to be removed from the fluidized fuel bed easily by means of the grid without entraining a substantial portion of the fuel.

In this manner, kiln 12 can be operated to calcine the solid pulverulent material delivered thereto through nozzles 56 by gasifying a solid fuel in a fluidized bed to produce an ascending current of gaseous fuel and injecting the material in an oxidizing carrier gas into the ascending gasified fuel current above the fluidized bed of solid fuel to disperse the pulverulent material in the gaseous fuel current. The flow velocity of the gases in the zone of injection of the material into the current is sufficient to entrain the material in the gases and to prevent them from falling into the fluidized bed. The air flow through the grid is not sufficient to assure the complete combustion of the solid fuel so that the gases rising from the fluidized fuel bed are reducing gases. At the level of nozzles 56, these gases mix with the injected air, in which the preheated material coming from preheater stage 4 is suspended. This mixture is very homogenous, due to the uniform distribution of the air through the entire cross section of the calcination chamber. Therefore, the pulverulent material suspended therein is rapidly calcined, due to the heat produced by the combustion of this gas mixture, without danger of fusion or softening of the calcined material particles. The particles are prevented from falling onto the fluidized fuel bed not only by the velocity of the updraft produced in the calcination chamber but also by constricted zone 54 separating the upper from the lower chamber portion.

Flue 40 connects upper chamber portion 52 of calcination kiln 12 to cyclone 14 where the at least partially decarbonized raw material is separated from the exhaust gases which leave cyclone 14 by flue 42 leading to flue 22 where they are mixed with the exhaust fumes from rotary kiln 16. The at least partially decarbonized raw material is delivered through conduit 44 from cyclone 14 into the upstream end of kiln 16 for conversion into cement clinker. In this manner, the calcined cement clinker raw material is separate from the fumes produced by combustion of the fuel and carrier gas for the material, the separated material is introduced into the kiln for producing the cement clinker, and the fumes are used for preheating the raw material before it is injected into the ascending current of gasified fuel.

Downstream of cyclone 4, flue 22 has constricted section 46 to equalize the pressure losses in circuits 16, 20 and 4, on the one hand, and 38, 12 and 14, on the other hand, and to obtain the desired distribution of the air flow coming from clinker cooler 18 between kilns 12 and 16.

While the present invention has been described and illustrated in connection with a now preferred embodiment, it will be understood that many variations and modifications may occur to those skilled in the art without departing from the spirit and scope of this invention as defined in the appended claims.

What we claim is:

1. An apparatus for the calcination of a solid pulverulent material, which comprises the combination of
   (a) a lower chamber having a bottom,
   (b) a grid at the bottom of the lower chamber,
   (c) means for delivering a solid fuel to the grid,
   (d) means for blowing air into the lower chamber across the grid to form a fluidized bed of the solid fuel on the grid and to gasify the solid fuel whereby an ascending current of gaseous fuel is produced in the lower chamber above the fluidized bed of solid fuel,
   (e) an upper chamber,
   (f) a zone of reduced cross-section interconnecting the lower chamber and the upper chamber whereby said ascending current of gaseous fuel flows from said lower chamber to said upper chamber through said zone of reduced cross-section, and
   (g) means for injecting the pulverulent material together with an oxidizing gas into the upper chamber said means being constituted by an array of nozzles regularly spaced about the perimeter of the upper chamber.

2. The apparatus of claim 1, wherein at least a forward part of the grid is inclined and mobile, and the surface of the fluidized bed is below the level of the forward end of the mobile grid.

3. The apparatus of claim 1, wherein the nozzles are disposed at a predetermined side of the chamber.

* * * * *